US012710011B2

(12) United States Patent
Durocher et al.

(10) Patent No.: US 12,710,011 B2
(45) Date of Patent: Aug. 18, 2026

(54) COMPRESSED AIR SYSTEM FOR AIRCRAFT

(71) Applicant: Pratt & Whitney Canada Corp., Longueuil (CA)

(72) Inventors: Eric S. Durocher, Boucherville (CA); Scott Smith, St-Lambert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/519,465

(22) Filed: Nov. 27, 2023

(65) Prior Publication Data

US 2025/0172092 A1 May 29, 2025

(51) Int. Cl.

*F02C 7/224* (2006.01)
*B64D 37/30* (2006.01)
*F02C 7/04* (2006.01)
*F02C 7/32* (2006.01)
*B64D 33/02* (2006.01)

(52) U.S. Cl.

CPC .............. *F02C 7/224* (2013.01); *B64D 37/30* (2013.01); *F02C 7/04* (2013.01); *F02C 7/32* (2013.01); *B64D 2033/0233* (2013.01); *F05D 2260/20* (2013.01)

(58) Field of Classification Search

CPC ........................................................ F02C 7/224

See application file for complete search history.

(56) References Cited

U.S. PATENT DOCUMENTS 11,773,782 B2 10/2023 Johnson
2016/0123226 A1* 5/2016 Razak ........................ F02C 7/18 60/39.15
2017/0268430 A1* 9/2017 Schwarz ................... F02C 9/18
2021/0340908 A1 11/2021 Boucher
2021/0348561 A1 11/2021 Cocks
2022/0397062 A1* 12/2022 Terwilliger ............. F02C 7/141
2023/0011956 A1 1/2023 Wiedenhoefer
2023/0280032 A1* 9/2023 Clark ...................... F02C 7/224 60/730
2024/0133343 A1* 4/2024 Palmer ...................... F02C 7/14
2024/0318596 A1* 9/2024 Fukuchi .................... F02C 7/22

OTHER PUBLICATIONS

EP Search Report for EP Patent Application No. 24215919.2 dated May 14, 2025.

* cited by examiner

*Primary Examiner* — Scott J Walthour
(74) *Attorney, Agent, or Firm* — Getz Balich LLC

(57) ABSTRACT

A system is provided for an aircraft. This aircraft system includes an engine, a fuel system and an air system. The fuel system includes a fuel circuit, a fuel source, a heat exchanger and a turboexpander. The fuel circuit is configured to direct fuel from the fuel source, through the heat exchanger and the turboexpander, to the engine for combustion. The heat exchanger is configured to transfer heat energy from combustion products generated by the combustion of the fuel in the engine into the fuel in the fuel circuit. The air system is discrete from the engine. The air system includes an air compressor and the turboexpander. The air system is configured to expand the fuel directed across the turboexpander by the fuel circuit to power operation of the air compressor.

16 Claims, 7 Drawing Sheets

COMPRESSED AIR SYSTEM FOR AIRCRAFT

TECHNICAL FIELD

This disclosure relates generally to an aircraft and, more particularly, to an air system for the aircraft.

BACKGROUND INFORMATION

An aircraft may include an air system for providing compressed air to a pneumatic system of the aircraft. Various types and arrangements of air systems are known in the art. While these known air systems have various benefits, there is still room in the art for improvement.

SUMMARY

According to an aspect of the present disclosure, a system is provided for an aircraft. This aircraft system includes an engine, a fuel system and an air system. The fuel system includes a fuel circuit, a fuel source, a heat exchanger and a turboexpander. The fuel circuit is configured to direct fuel from the fuel source, through the heat exchanger and the turboexpander, to the engine for combustion. The heat exchanger is configured to transfer heat energy from combustion products generated by the combustion of the fuel in the engine into the fuel in the fuel circuit. The air system is discrete from the engine. The air system includes an air compressor and the turboexpander. The air system is configured to expand the fuel directed across the turboexpander by the fuel circuit to power operation of the air compressor.

According to another aspect of the present disclosure, another system is provided for an aircraft. This aircraft system includes a pneumatic system, an air system and a fuel system. The air system includes an air compressor and a turboexpander. The air system is configured to expand fuel directed across the turboexpander to power operation of the air compressor. The air compressor is configured to provide compressed air for delivery to the pneumatic system. The fuel system includes a fuel circuit, a heat exchanger and the turboexpander. The fuel circuit is configured to direct the fuel through the heat exchanger to the turboexpander. The heat exchanger is configured to increase a temperature and a pressure of the fuel.

According to still another aspect of the present disclosure, another system is provided for an aircraft. This aircraft system includes a gas turbine engine, a fuel system and an air system. The gas turbine engine includes a compressor section, a combustor section, a turbine section and a flowpath extending through the compressor section, the combustor section and the turbine section from an inlet into the flowpath to an exhaust from the flowpath. The fuel system is configured to deliver fuel to the combustor section. The fuel system includes a fuel circuit, a fuel source, a heat exchanger and a turboexpander. The fuel circuit fluidly couples the fuel source to the combustor section. The fuel circuit extends sequentially through the heat exchanger and the turboexpander between the fuel source and the combustor section. The air system includes an air compressor and the turboexpander. The air compressor is fluidly independent of the flowpath. A turboexpander rotor in the turboexpander is coupled to and configured to drive rotation of an air compressor rotor in the air compressor.

The pneumatic system may be configured as or otherwise include a pneumatic anti-icing system.

The pneumatic system may include a pneumatic actuator.

The pneumatic system may be configured as or otherwise include an environmental control system for the aircraft.

The system may also include an engine. The fuel system may be configured to deliver the fuel to the engine for combustion. The heat exchanger may be configured to transfer heat energy from combustion products generated by the combustion of the fuel in the engine into the fuel in the fuel circuit.

The fuel may be or otherwise include hydrogen fuel. The fuel source may be configured as or otherwise include a hydrogen fuel reservoir.

The fuel system may be configured to store the fuel within the fuel source as a cryogenic liquid.

The fuel source may be configured to direct the fuel into the fuel circuit in a liquid phase. The heat exchanger may be configured to facilitate changing the fuel from the liquid phase to a gaseous phase. The air system may be configured to expand the fuel in the gaseous phase across the turboexpander before delivering the fuel in the gaseous phase to the engine.

The engine may be configured as or otherwise include a gas turbine engine.

The engine may include a compressor section, a combustor section, a turbine section and a flowpath extending through the compressor section, the combustor section and the turbine section from an inlet into the flowpath to an exhaust from the flowpath. The heat exchanger may be arranged along the flowpath between the combustor section and the exhaust from the flowpath.

The heat exchanger may be arranged along the flowpath between the turbine section and the exhaust from the flowpath.

The system may also include a pneumatic system configured to receive compressed air from the air compressor.

The pneumatic system may be configured to receive additional compressed air from a bleed circuit fluidly coupled to the engine.

The air compressor may be fluidly decoupled from the engine.

The system may also include an engine inlet and an air circuit inlet. The engine inlet may fluidly couple the engine to an environment external to the aircraft. The air circuit inlet may fluidly couple the air compressor to the environment external to the aircraft.

The system may also include an inlet structure fluidly coupling the engine and the air compressor in parallel to an environment external to the aircraft.

The system may also include a nacelle housing the engine. The air compressor may be located outside of the nacelle.

The system may also include a nacelle housing the engine and the air compressor.

The system may also include a propulsor rotor coupled to and configured to be driven by the engine.

The system may also include an electric generator rotor coupled to and configured to be driven by the engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
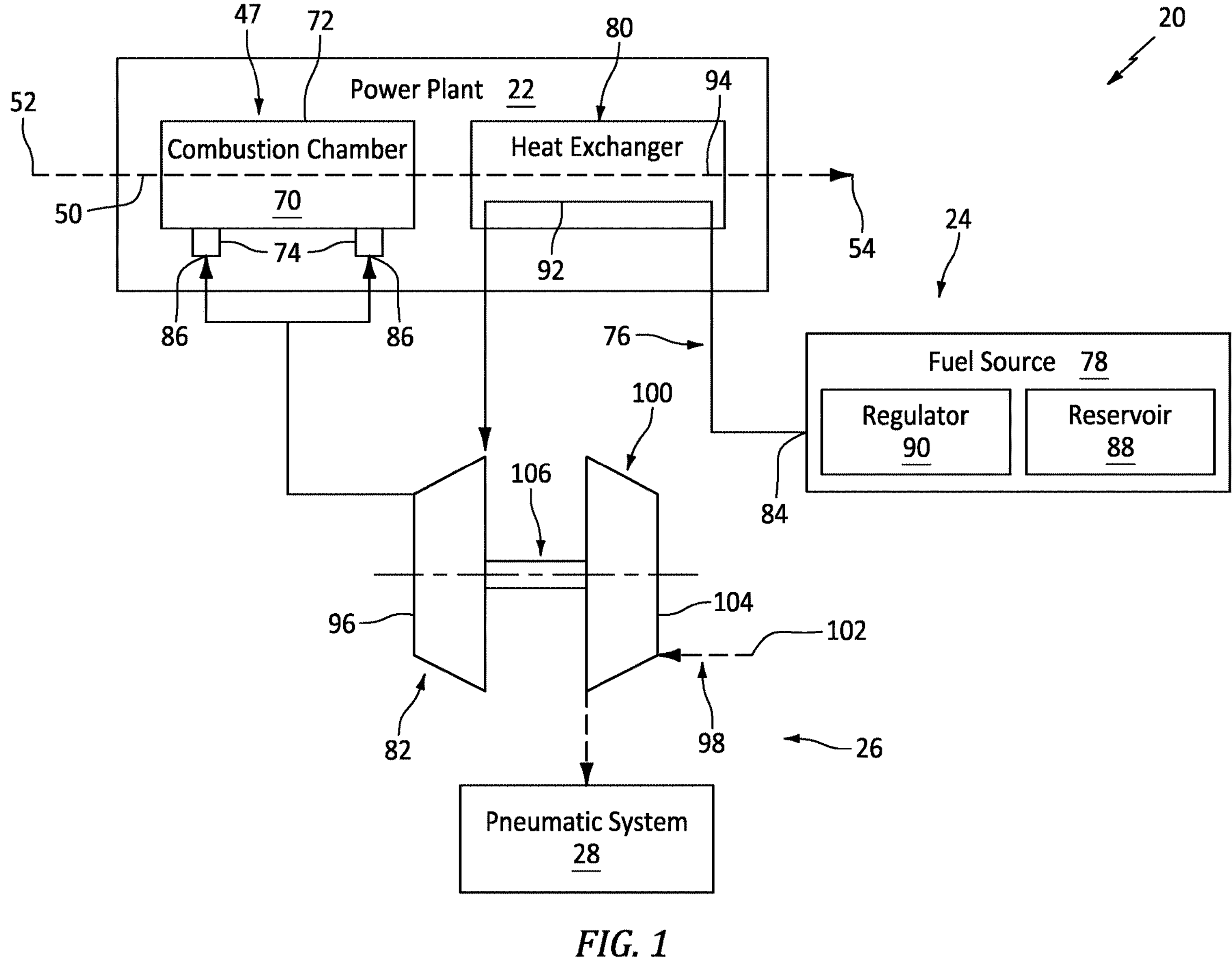
FIG. 1 is a schematic illustration of a system for an aircraft.

FIG. 1 illustrates a system 20 for an aircraft. The aircraft may be an airplane, a rotorcraft (e.g., a helicopter), a drone (e.g., an unmanned aerial vehicle (UAV)), or any other manned or unmanned aerial vehicle or system. The aircraft system 20 of FIG. 1 includes an aircraft powerplant 22, a fuel system 24, a compressed air system 26 and a pneumatic system 28.

The powerplant 22 may be configured as, or otherwise included as part of, a propulsion system for the aircraft. The powerplant 22 may also or alternatively be configured as, or otherwise included as part of, an electrical power system for the aircraft. The powerplant 22 of FIG. 2, for example, a mechanical load 30 and a core 32 of a gas turbine engine 34.

The mechanical load 30 may be configured as or otherwise include a rotor 36 mechanically driven and/or otherwise powered by the engine core 32. This driven rotor 36 may be a bladed propulsor rotor 38 (e.g., an air mover) where the aircraft system 20 is (or is part of) the aircraft propulsion system. The propulsor rotor 38 includes a plurality of rotor blades arranged circumferentially around and connected to at least (or only) one rotor base (e.g., a disk or a hub). The propulsor rotor 38 may be an open (e.g., un-ducted) propulsor rotor or a ducted propulsor rotor. Examples of the open propulsor rotor include a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. An example of the ducted propulsor rotor is a fan rotor for a turbofan propulsion system. The present disclosure, of course, is not limited to the foregoing exemplary propulsor rotor arrangements. Moreover, the driven rotor 36 may alternatively be a generator rotor of an electric power generator where the aircraft system 20 is (or is part of) the aircraft power system; e.g., an auxiliary power unit (APU) for the aircraft. However, for ease of description, the mechanical load 30 may be generally described below as a propulsor section of the gas turbine engine 34 and the driven rotor 36 may be generally described as the propulsor rotor 38 within the propulsor section.

The engine core 32 extends axially along an axis 40 between an upstream, forward end of the engine core 32 and a downstream, aft end of the engine core 32. This axis 40 may be a centerline axis of the gas turbine engine 34 and/or its engine core 32. The axis 40 may also or alternatively be a rotational axis of one or more rotating assemblies (e.g., 42 and 44) of the gas turbine engine 34 and its engine core 32. The engine core 32 includes a core compressor section 46, a core combustor section 47, a core turbine section 48, a core exhaust section 49 and a core flowpath 50. The turbine section 48 of FIG. 2 includes a high pressure turbine (HPT) section 48A and a low pressure turbine (LPT) section 48B; e.g., a power turbine (PT) section. The core flowpath 50 extends sequentially through the compressor section 46, the combustor section 47, the HPT section 48A, the LPT section 48B and the exhaust section 49 from an airflow inlet 52 into the core flowpath 50 to a combustion products exhaust 54 from the core flowpath 50. The core inlet 52 may be disposed at (e.g., on, adjacent or proximate) the forward end of the engine core 32, and the core exhaust 54 may be disposed at the aft end of the engine core 32.

Figure 2:
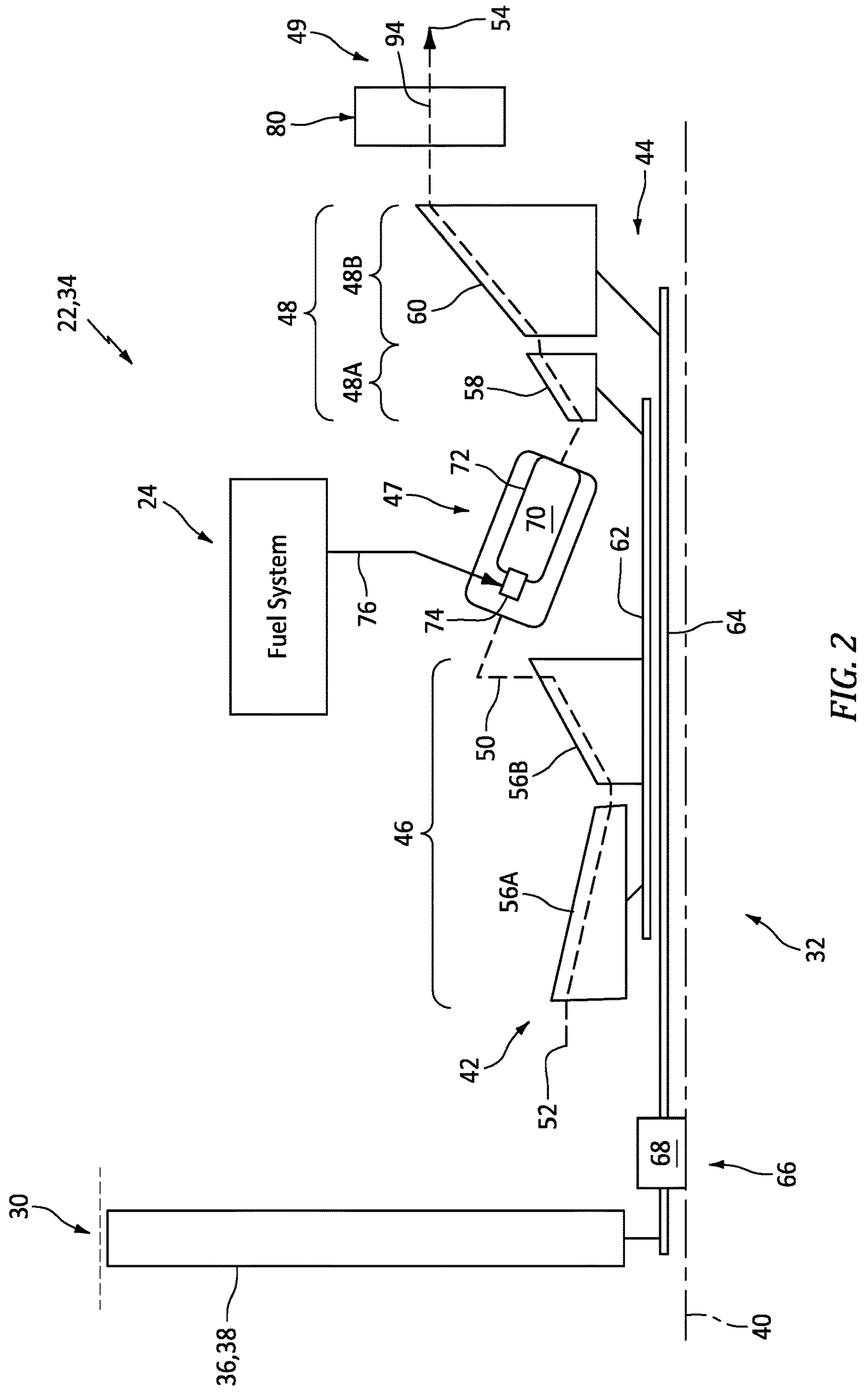
FIG. 2 is a partial schematic illustration of a powerplant for the aircraft system.

The compressor section 46 includes one or more bladed compressor rotors 56A and 56B (generally referred to as "56"). The first stage compressor rotor 56A of FIG. 2 is configured as an axial flow compressor rotor; e.g., an axial inflow-axial outflow compressor rotor. The second stage compressor rotor 56B of FIG. 2 is configured as a radial flow compressor rotor; e.g., an axial inflow-radial outflow compressor rotor. Each of these compressor rotors 56 includes a plurality of compressor blades (e.g., compressor airfoils, compressor vanes, etc.) arranged circumferentially around and connected to at least (or only) one rotor base (e.g., a disk, a hub, etc.). The compressor rotors 56 are disposed in and arranged longitudinally along the core flowpath 50 between the core inlet 52 and the combustor section 47. The compressor blades, for example, are disposed in and extend across the core flowpath 50. Each rotor base is disposed adjacent (e.g., radially below) the core flowpath 50. The present disclosure, however, is not limited to the foregoing exemplary compressor section arrangement. For example, while the compressor section 46 is schematically shown in FIG. 2 with two stages, the compressor section 46 may alternatively include a single one of the stages or more than two stages. Moreover, while the compressor rotors 56 are respectively shown as axial and radial flow compressor rotors, any one or more of the compressor rotors 56 may alternatively be configured as an axial flow compressor rotor or a radial flow compressor rotor.

The HPT section 48A includes a bladed high pressure turbine (HPT) rotor 58. The HPT rotor 58 of FIG. 2 is configured as an axial flow turbine rotor; e.g., an axial inflow-axial outflow turbine rotor. The HPT rotor 58 includes a plurality of turbine blades (e.g., turbine airfoils, turbine vanes, etc.) arranged circumferentially around and connected to at least (or only) one rotor base (e.g., a disk, a hub, etc.). The HPT rotor 58 is disposed in and arranged longitudinally along the core flowpath 50 between the combustor section 47 and the LPT section 48B. The turbine blades, for example, are disposed in and extend across the core flowpath 50. The rotor base is disposed adjacent (e.g., radially below) the core flowpath 50. The present disclosure, however, is not limited to the foregoing exemplary HPT section arrangement. For example, while the HPT section 48A is schematically shown in FIG. 2 with a single stage, the HPT section 48A may alternatively include multiple stages. Moreover, while the HPT rotor 58 is shown as an axial flow turbine rotor, the HPT rotor 58 may alternatively be configured as a radial flow turbine rotor.

The LPT section 48B includes a bladed low pressure turbine (LPT) rotor 60. The LPT rotor 60 of FIG. 2 is configured as an axial flow turbine rotor; e.g., an axial inflow-axial outflow turbine rotor. The LPT rotor 60 includes a plurality of turbine blades (e.g., turbine airfoils, turbine vanes, etc.) arranged circumferentially around and connected to at least (or only) one rotor base (e.g., a disk, a hub, etc.). The LPT rotor 60 is disposed in and arranged longitudinally along the core flowpath 50 between the HPT section 48A and the exhaust section 49 and its core exhaust 54. The turbine blades, for example, are disposed in and extend across the core flowpath 50. The rotor base is disposed adjacent (e.g., radially below) the core flowpath 50. The present disclosure, however, is not limited to the foregoing exemplary LPT section arrangement. For example, while the LPT section 48B is schematically shown in FIG. 2 with a single stage, the LPT section 48B may alternatively include multiple stages. Moreover, while the LPT rotor 60 is shown as an axial flow turbine rotor, the LPT rotor 60 may alternatively be configured as a radial flow turbine rotor.

The compressor rotors 56 are coupled to and rotatable with the HPT rotor 58. The compressor rotors 56 of FIG. 2, for example, are connected to the HPT rotor 58 by a high speed shaft 62. At least (or only) the compressor rotors 56, the HPT rotor 58 and the high speed shaft 62 collectively form the high speed rotating assembly 42; e.g., a high speed spool. The LPT rotor 60 is connected to a low speed shaft 64. At least (or only) the LPT rotor 60 and the low speed shaft 64 collectively form the low speed rotating assembly 44. This low speed rotating assembly 44 is further coupled to the driven rotor 36 (e.g., the propulsor rotor 38) through a drivetrain 66. The drivetrain 66 may be configured as a geared drivetrain, where a geartrain 68 (e.g., a transmission, a speed change device, an epicyclic geartrain, etc.) is disposed between and operatively couples the driven rotor 36 to the low speed rotating assembly 44 and its LPT rotor 60. With this arrangement, the driven rotor 36 may rotate at a different (e.g., slower) rotational velocity than the low speed rotating assembly 44 and its LPT rotor 60. However, the drivetrain 66 may alternatively be configured as a direct drive drivetrain, where the geartrain 68 is omitted. With this arrangement, the driven rotor 36 rotates at a common (the same) rotational velocity as the low speed rotating assembly 44 and its LPT rotor 60. Referring again to FIG. 2, each of the rotating assemblies 42 and 44 and its members may be rotatable about the axis 40.

During operation of the gas turbine engine 34, air may be directed across the driven rotor 36 (e.g., the propulsor rotor 38) and into the engine core 32 through the core inlet 52. This air entering the core flowpath 50 may be referred to as core air. The core air is compressed by the compressor rotors 56 and directed into a combustion chamber 70 (e.g., an annular combustion chamber) within a combustor 72 (e.g., an annular combustor) of the combustor section 47. Fuel such as hydrogen gas ($H_2$ gas) is injected into the combustion chamber 70 by one or more fuel injectors 74 (see also FIG. 1) and mixed with the compressed core air to provide a fuel-air mixture. This fuel-air mixture is ignited and combustion products thereof flow through and sequentially cause the HPT rotor 58 and the LPT rotor 60 to rotate. The rotation of the HPT rotor 58 drives rotation of the compressor rotors 56 and, thus, the compression of the air received from the core inlet 52. The rotation of the LPT rotor 60 drives rotation of the driven rotor 36. Where the driven rotor 36 is configured as the propulsor rotor 38, the rotation of that propulsor rotor 38 may propel additional air (e.g., outside air, bypass air, etc.) outside of the engine core 32 to provide aircraft thrust and/or lift. Where the driven rotor 36 is configured as the generator rotor, the rotation of that generator rotor may facilitate generation of electricity.

Referring to FIG. 1, the fuel system 24 is configured to deliver the fuel to the gas turbine engine 34. More particularly, the fuel system 24 of FIG. 1 is configured to deliver the fuel to the combustor section 47 and its one or more fuel injectors 74 for injection into the combustion chamber 70. This fuel may be a non-hydrocarbon fuel such as hydrogen ($H_2$) fuel. The fuel is delivered by the fuel system 24 of FIG. 1 to the fuel injectors 74 in a gaseous phase; e.g., gaseous hydrogen ($H_2$) fuel/hydrogen ($H_2$) gas. However, the fuel is stored within the fuel system 24 of FIG. 1 in a liquid phase; e.g., liquid hydrogen ($H_2$) fuel. The fuel system 24 of FIG. 1 includes a fuel circuit 76, a fuel source 78, a heat exchanger 80 and a turboexpander 82.

The fuel circuit 76 is configured as a fuel flowpath for directing the fuel from the fuel source 78 to the fuel injectors 74. This fuel circuit 76 extends sequentially through the heat exchanger 80 and the turboexpander 82 from an outlet 84 from the fuel source 78 to an inlet 86 into each fuel injector 74. The fuel circuit 76 thereby fluidly couples the fuel source outlet 84 to each fuel injector inlet 86 and, thus, the combustor section 47.

The fuel source 78 of FIG. 1 includes a fuel reservoir 88 and a flow regulator 90. The fuel reservoir 88 is configured to store a quantity of the fuel (e.g., in its liquid phase as a cryogenic liquid) before, during and/or after aircraft system operation. The fuel reservoir 88, for example, may be configured as or otherwise include a tank, a cylinder, a pressure vessel, a bladder or any other type of (e.g., insulated) fuel storage container. The flow regulator 90 is configured to direct a flow of the fuel (e.g., in its liquid phase) from the fuel reservoir 88 into the fuel circuit 76. The flow regulator 90, for example, may be configured as or otherwise include a fuel compressor, a fuel pump and/or a fuel valve (or valves).

The heat exchanger 80 includes an internal fuel passage 92 and an internal combustion products passage 94 which is fluidly discrete from the fuel passage 92. The fuel passage 92 forms a portion of the fuel circuit 76 which extends longitudinally through the heat exchanger 80. The combustion products passage 94 forms a portion of the core flowpath 50 which extends longitudinally through the heat exchanger 80. Referring to FIG. 2, the portion of the core flowpath 50 formed by the combustion products passage 94 may be arranged between (A) the LPT section 48B and its LPT rotor 60 and (B) the core exhaust 54; e.g., within the exhaust section 49 of the gas turbine engine 34. The heat exchanger 80 and its combustion products passage 94, however, may alternatively be arranged elsewhere along the core flowpath 50 downstream of the combustor section 47 in other embodiments. The heat exchanger 80, for example, may alternatively be arranged between (A) the HPT section 48A and its HPT rotor 58 and (B) the LPT section 48B and its LPT rotor 60. In another example, the heat exchanger 80 may alternatively be arranged between (A) the combustor section 47 and (B) the (e.g., entire) turbine section 48 and its turbine rotors 58 and 60.

The heat exchanger 80 of FIG. 1 is schematically shown as a single pass, counterflow heat exchanger. The heat exchanger 80, however, is not limited to such an exemplary arrangement. The heat exchanger 80, for example, may alternatively be configured as a parallel flow heat exchanger, a crossflow heat exchanger, or any other type of heat exchanger. Moreover, each heat exchanger passage 92, 94 may make any number of passes (e.g., a single pass or multiple passes) within the heat exchanger 80.

The turboexpander 82 includes a bladed turboexpander rotor 96; e.g., a fuel driven turbine rotor. The turboexpander rotor 96 of FIG. 1 is configured as a radial flow turboexpander rotor; e.g., a radial inflow-axial outflow turboexpander rotor. The turboexpander rotor 96 includes a plurality of turboexpander blades (e.g., turboexpander airfoils, turboexpander vanes, etc.) arranged circumferentially around and connected to at least (or only) one rotor base (e.g., a disk, a hub, etc.). The turboexpander rotor 96 of FIG. 1 is disposed in and arranged longitudinally along the fuel circuit 76 between the heat exchanger 80 and the fuel injectors 74. The turboexpander blades, for example, are disposed in and extend across the fuel circuit 76. The rotor base is disposed adjacent (e.g., radially below) the fuel circuit 76. The present disclosure, however, is not limited to the foregoing exemplary turboexpander arrangement. For example, while the turboexpander 82 is shown in FIG. 1 with a single stage, the turboexpander 82 may alternatively include multiple stages. Moreover, while the turboexpander rotor 96 is shown as a radial flow turboexpander rotor, the turboexpander rotor 96 may alternatively be configured as an axial flow turboexpander rotor; e.g., an axial inflow-axial outflow turboexpander rotor.

The air system 26 is configured to deliver compressed air (e.g., independent of the powerplant 22 and its compressor section 46; see FIG. 2) to the pneumatic system 28. The air system 26 of FIG. 1 includes an air circuit 98, an air compressor 100 and the turboexpander 82.

The air circuit 98 is configured as an air flowpath for directing air from an inlet 102 into the air circuit 98 to the pneumatic system 28. This air circuit 98 extends through the air compressor 100 from the air circuit inlet 102 to the pneumatic system 28.

The air compressor 100 includes a bladed air compressor rotor 104. The air compressor rotor 104 of FIG. 1 is configured as a radial flow air compressor rotor; e.g., an axial inflow-radial outflow air compressor rotor. The air compressor rotor 104 includes a plurality of compressor blades (e.g., compressor airfoils, compressor vanes, etc.) arranged circumferentially around and connected to at least (or only) one rotor base (e.g., a disk, a hub, etc.). The air compressor rotor 104 of FIG. 1 is disposed in and arranged longitudinally along the air circuit 98 between the air circuit inlet 102 and the pneumatic system 28. The compressor blades, for example, are disposed in and extend across the air circuit 98. The rotor base is disposed adjacent (e.g., radially below) the air circuit 98. The present disclosure, however, is not limited to the foregoing exemplary air compressor arrangement. For example, while the air compressor 100 is shown in FIG. 1 with a single stage, the air compressor 100 may alternatively include multiple stages. Moreover, while the air compressor rotor 104 is shown as a radial flow air compressor rotor, the air compressor rotor 104 may alternatively be configured as an axial flow air compressor rotor; e.g., an axial inflow-axial outflow air compressor rotor.

The turboexpander rotor 96 is coupled to and rotatable with the air compressor rotor 104 through a drivetrain 106. This drivetrain 106 may be a geared drivetrain or a direct drive drivetrain as described above, for example. With such an arrangement, energy may be extracted from the fuel using the turboexpander rotor 96 as described below in further detail to drive rotation of the air compressor rotor 104. The turboexpander 82 may thereby mechanically power the air compressor 100.

Figure 3C:
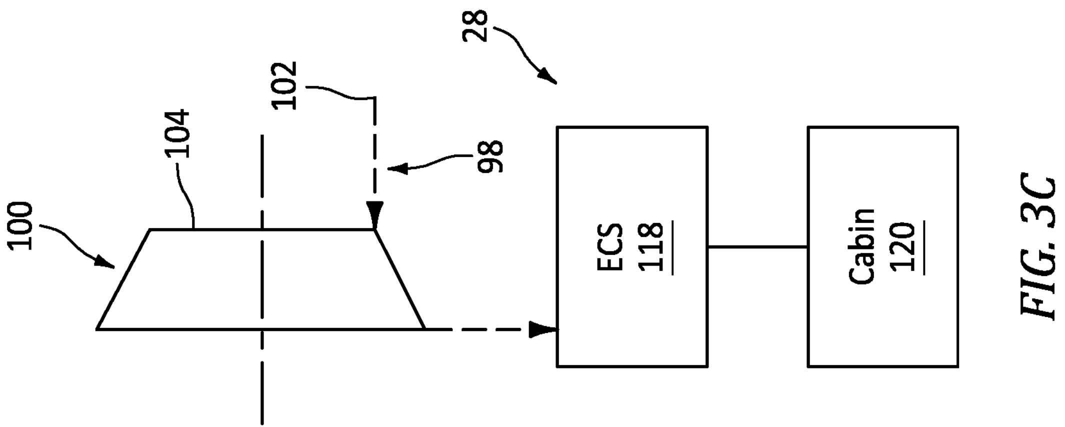
FIGS. 3A-C are partial schematic illustrations of an air compressor of a compressed air system fluidly coupled to various pneumatic systems.
Figure 3B:
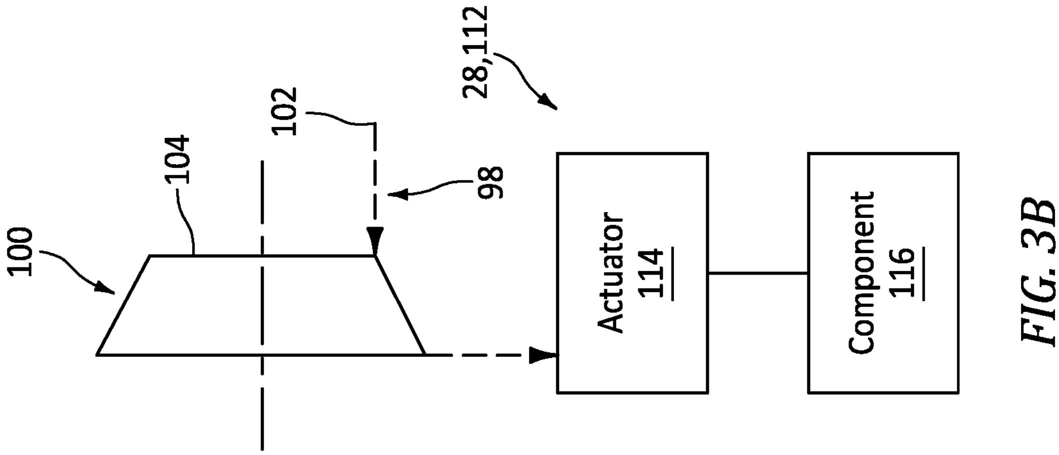
Figure 3A:
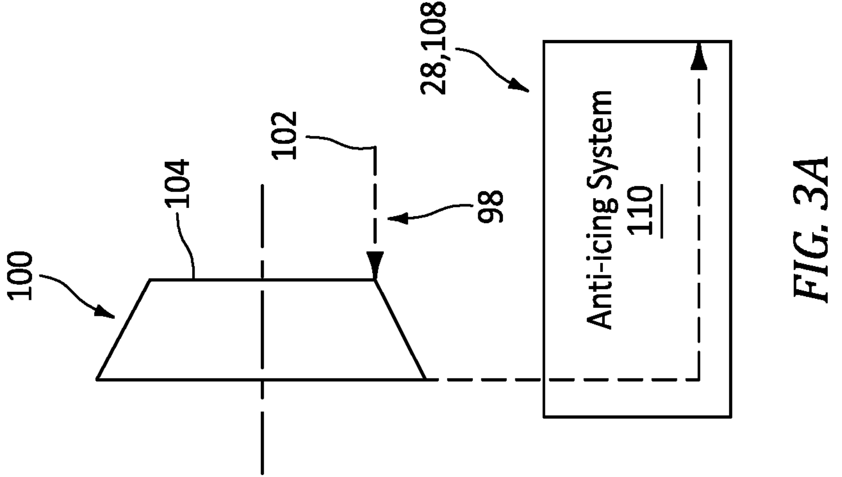

The pneumatic system 28 may be configured as or otherwise include any component of the aircraft which operates using compressed air. For example, referring to FIG. 3A, the pneumatic system 28 may be configured as or otherwise include a pneumatic anti-icing system 108. This anti-icing system 108 may utilize relatively warm compressed air received from the air compressor 100 to heat an external surface 110 of the aircraft. The anti-icing system 108 may thereby prevent or reduce ice accumulation on the external aircraft surface 110. Examples of the external aircraft surface 110 include, but are not limited to, a leading edge surface of a nacelle housing the powerplant and its gas turbine engine, a leading edge of an aircraft wing, a leading edge of an aircraft stabilizer, and the like. In another example, referring to FIG. 3B, the pneumatic system 28 may be configured as or otherwise include a pneumatic actuation system 112. This actuation system 112 may include a pneumatic actuator 114 (or multiple pneumatic actuators) which operate utilizing the compressed air received from the air compressor 100 to move or otherwise actuate a component 116 (or multiple components) of the aircraft. This aircraft component 116 may be configured discrete from the powerplant. Alternatively, the aircraft component 116 may be arranged with and/or configured as part of the powerplant and its gas turbine engine. In another example, referring to FIG. 3C, the pneumatic system 28 may be configured as or otherwise include an environmental control system 118 (ECS) for a cabin 120 and/or another enclosed compartment of the aircraft. In still another example, the pneumatic system 28 may be configured as or otherwise include a leading edge wing boot for an aircraft wing. The present disclosure, however, is not limited to the foregoing exemplary pneumatic system configurations.

During operation of the aircraft system 20 of FIG. 1, the fuel system 24 directs a flow of the fuel stored within the fuel source 78 and its fuel reservoir 88 sequentially through the heat exchanger 80 and the turboexpander 82 to the fuel injectors 74. As the fuel flows through the heat exchanger 80, the heat exchanger 80 transfer heat energy from the relatively warm combustion products in the combustion products passage 94 to the relative cool fuel (e.g., liquid hydrogen) in the fuel passage 92. The heat exchanger 80 thereby heats the fuel. This heating of the fuel raises a temperature of the fuel as well as facilitate a phase change of the fuel from its liquid phase to its gaseous phase. The gaseous fuel exiting the heat exchanger 80 is therefore warmer and at a higher pressure than the liquid fuel entering the heat exchanger 80. The warm and high pressure gaseous fuel is then expanded across the turboexpander 82. This expansion of the gaseous fuel drives rotation of the turboexpander rotor 96, and the rotation of the turboexpander rotor 96 drives rotation of the air compressor rotor 104. The expansion of the gaseous fuel also decreases a pressure of the gaseous fuel. The gaseous fuel exiting the turboexpander 82 is therefore at a lower pressure than the gaseous fuel entering the turboexpander 82. The lower pressure gaseous fuel is then delivered to the combustor section 47 and its fuel injectors 74 to facilitate operation of the gas turbine engine 34 as described above.

Figure 4:
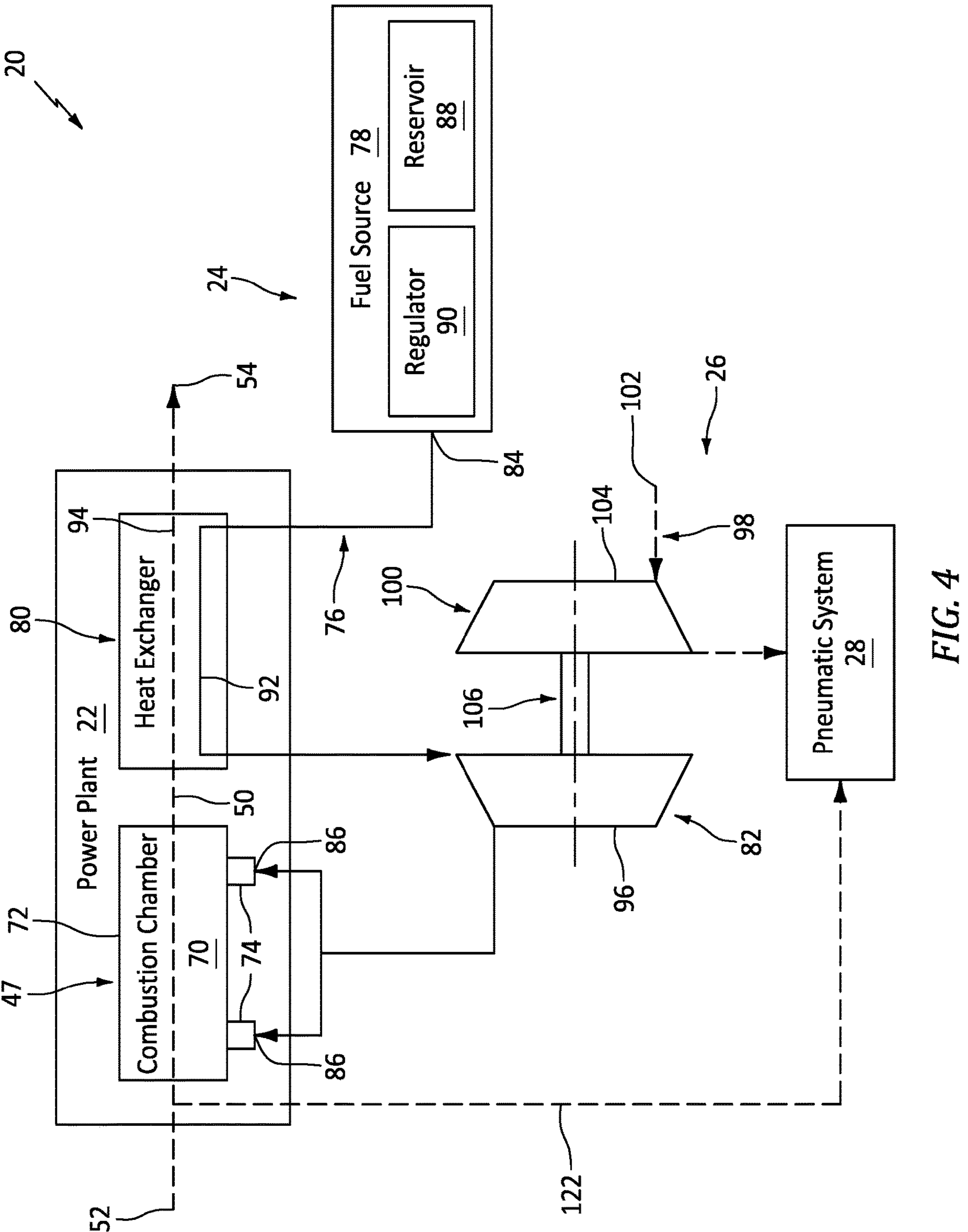
FIG. 4 is a schematic illustration of the aircraft system with an additional bleed circuit for the pneumatic system.

An upstream section of the air circuit 98 directs air from the air circuit inlet 102 to the air compressor 100. The rotation of the air compressor rotor 104 compresses the air to provide compressed air. This compression increases a pressure of the air as well as a temperature of the air. The air exiting the air compressor 100 is therefore warmer and at a higher pressure than the gas entering the air compressor 100. A downstream section of the air circuit 98 then directs the compressed air to the pneumatic system 28 to facilitate operation of the pneumatic system 28. With such an arrangement, the pneumatic system 28 may be operated (e.g., only) using the compressed air from the air system 26 and its air compressor 100. The pneumatic system 28 may thereby be operated without use of (e.g., any) bleed air from the gas turbine engine 34 and, for example, its compressor section 46 (see FIG. 2). Bleed air demand on the gas turbine engine 34 and its compressor section may thereby be decreased or eliminated, at least associated with operation of the pneumatic system 28. Decreasing and/or eliminating bleed air demand on the gas turbine engine 34 and its compressor section may in turn facilitate increased gas turbine engine power and/or efficiency. The present disclosure, however, is not limited to such an exemplary arrangement. For example, referring to FIG. 4, the pneumatic system 28 may also be configured to operate using bleed air from the gas turbine engine 34 and its compressor section 46 (see FIG. 2); e.g., see bleed circuit 122. With such an arrangement, the compressed air from the air compressor 100 may be used to (e.g., selectively) supplement the bleed air from the compressor section 46 (see FIG. 2), or the bleed air from the compressor section 46 (see FIG. 2) may be used to (e.g., selectively) supplement the compressed air from the air compressor 100.

Figure 6:
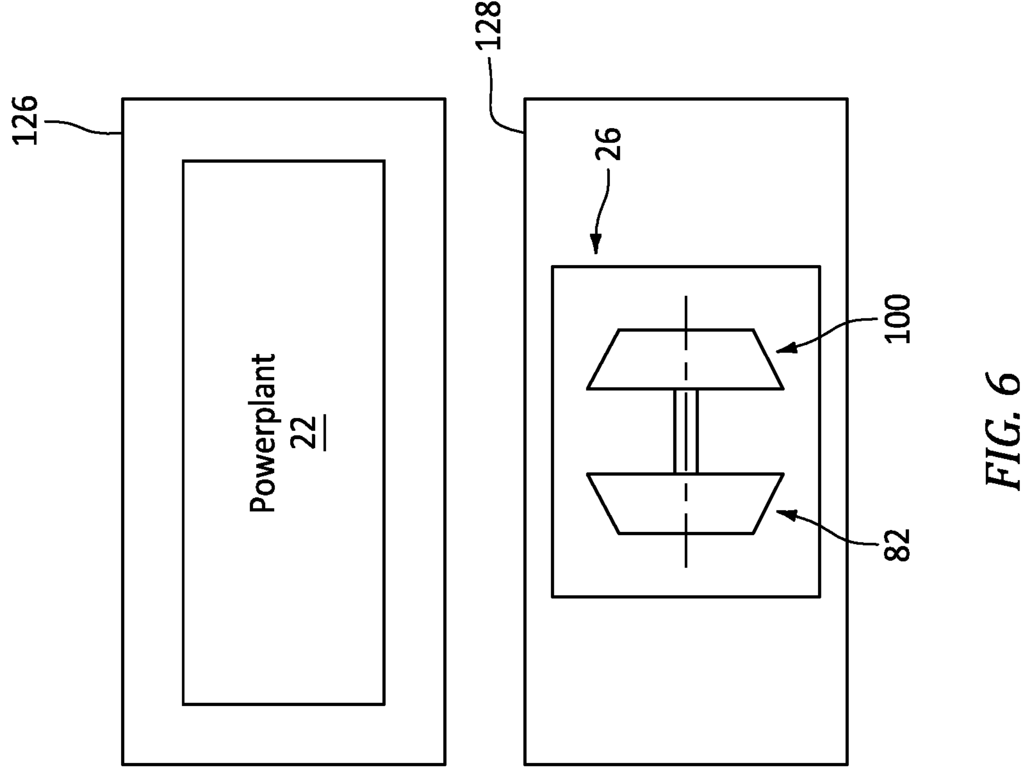
FIG. 6 is a schematic illustration of the powerplant and the air system housed in different aircraft structures.
Figure 5:
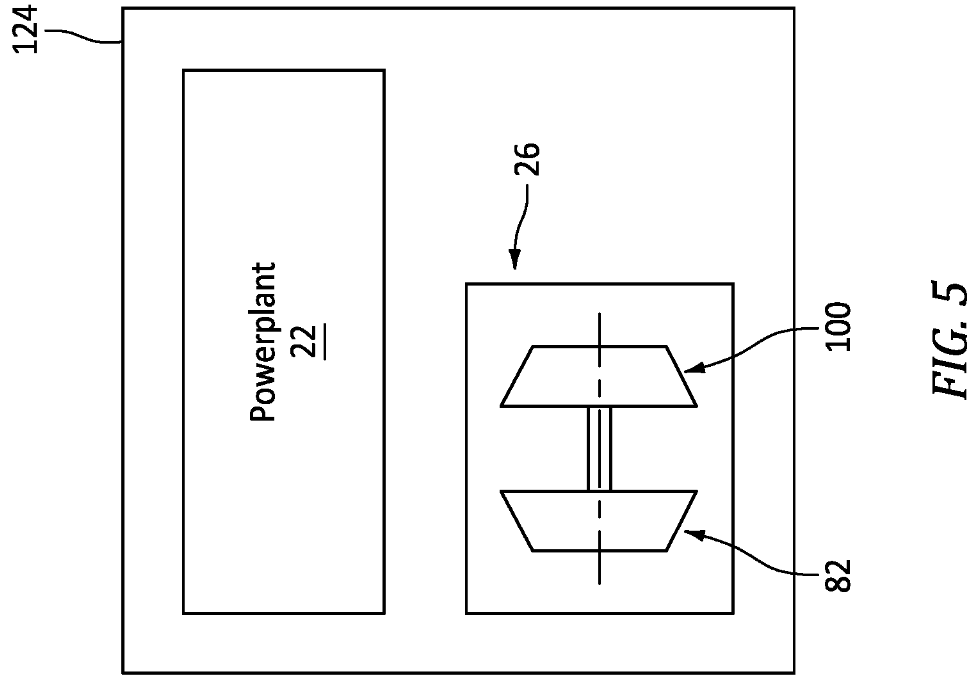
FIG. 5 is a schematic illustration of the powerplant and the air system housed in a common aircraft structure.

Referring again to FIG. 1, the air system 26 may be configured discrete from the powerplant 22 and its gas turbine engine 34. The air system 26, for example, may be arranged outside of, physically distinct from and/or may not be configured as an operational part of the powerplant 22 and its gas turbine engine 34. The air system 26 and its air circuit 98 may also or alternatively be fluidly independent of (e.g., fluidly decoupled from) the gas turbine engine 34 and its core flowpath 50. However, referring to FIG. 5, the powerplant 22 and the air system 26 may be housed within a common structure 124 of the aircraft; e.g., a propulsion system nacelle, a fuselage, etc. The powerplant 22 and the air system 26 of FIG. 5, for example, are both located within an interior of the aircraft structure 124. With such an arrangement, the air compressor 100 may be mounted to a case of the powerplant 22 and its gas turbine engine 34. Alternatively, the air compressor 100 and the gas turbine engine 34 may be independently mounted and/or supported by a support structure; e.g., a pylon, a frame, etc. In other embodiments, referring to FIG. 6, the powerplant 22 and the air system 26 (or at least one or more of its members 82, 100) may be housed in different structures 126 and 128 of the aircraft. The powerplant 22 of FIG. 6, for example, is located within an interior of the first aircraft structure 126; e.g., the propulsion system nacelle. The air compressor 100 and the turboexpander 82 are located within an interior of the second aircraft structure 128; e.g., the fuselage, a wing, or another part of an airframe of the aircraft.

Figure 7:
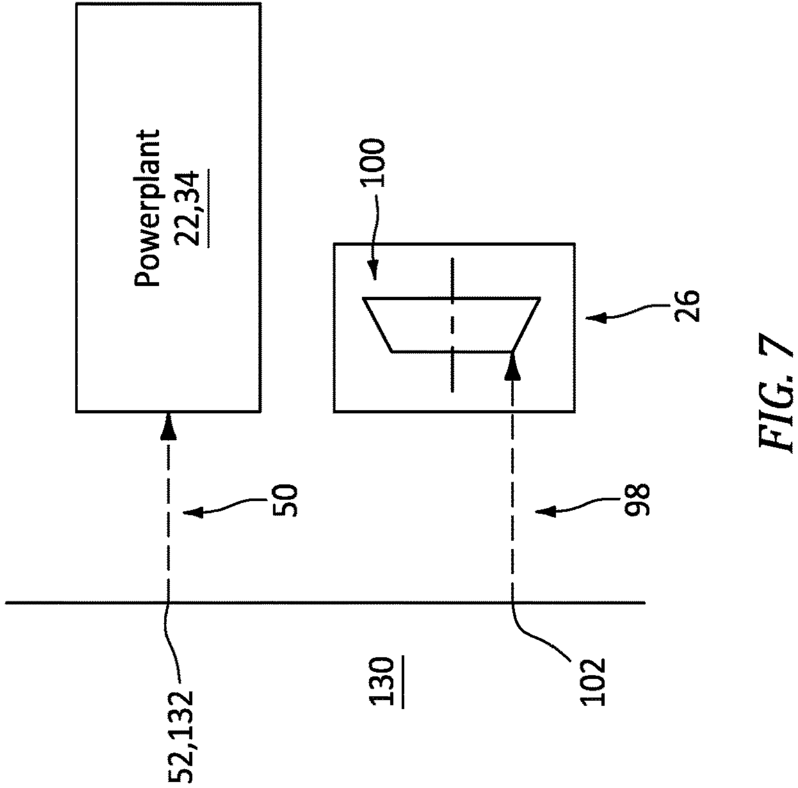
FIG. 7 is a schematic illustration of the powerplant and the air system discretely fluidly coupled to an external environment.

In some embodiments, referring to FIG. 7, (A) the powerplant 22 and its gas turbine engine 34 and (B) the air system 26 and its air compressor 100 may be independently fluidly coupled to an environment 130 external to the aircraft. For example, an airflow inlet 132 (e.g., an engine inlet) into the gas turbine engine 34 and the air circuit inlet 102 may each be separately fluidly coupled to the external environment 130. The airflow inlet 132 may be the same as the core inlet 52 in some embodiments where, for example, the powerplant 22 is configured as a turboprop propulsion system or a turboshaft propulsion system. Alternatively, the airflow inlet 132 may be different than and upstream of the core inlet 52 where, for example, the powerplant 22 is configured as a turbofan propulsion system. In the embodiment of FIG. 7, the airflow inlet 132 and the air circuit inlet 102 are each directly fluidly coupled to the external environment 130. However, in other embodiments, the airflow inlet 132 and/or the air circuit inlet 102 may each be respectively fluidly coupled to the external environment 130 through another intermediate component and/or passage.

Figure 8:
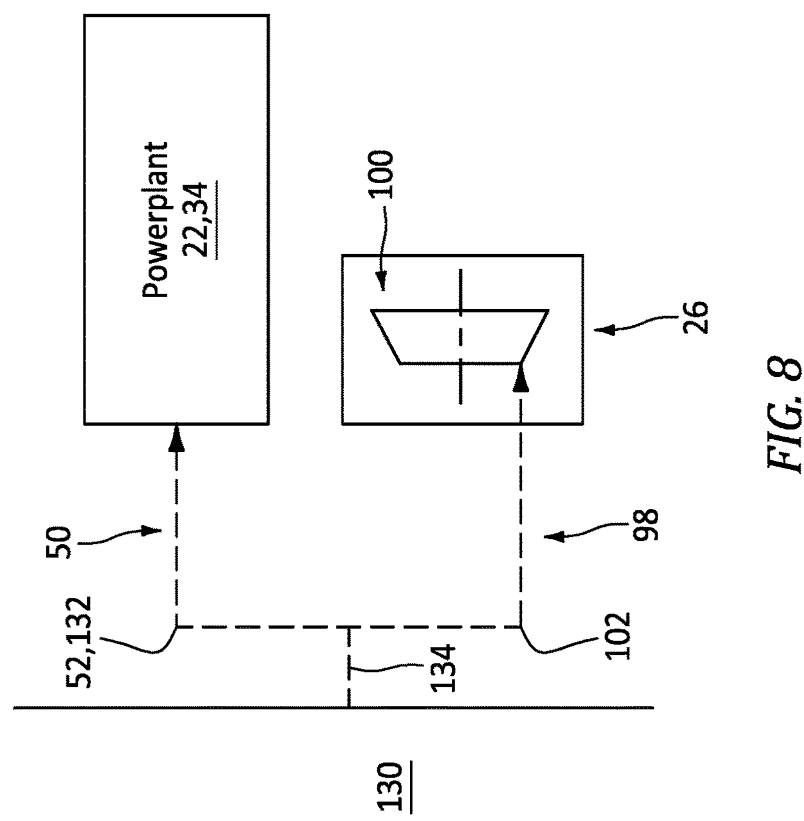
FIG. 8 is a schematic illustration of the powerplant and the air system fluidly coupled to the external environment in parallel through a common inlet structure.

In some embodiments, referring to FIG. 8, (A) the powerplant 22 and its gas turbine engine 34 and (B) the air system 26 and its air compressor 100 may be fluidly coupled to the external environment 130 in parallel. The airflow inlet 132 and the air circuit 98 of FIG. 8, for example, are fluidly coupled in parallel to the external environment 130 through a common inlet structure 134. However, the airflow inlet 132 receives the incoming air independent of the air circuit 98, and the air circuit inlet 102 receives the incoming air independent of the core flowpath 50.

Figure 9:
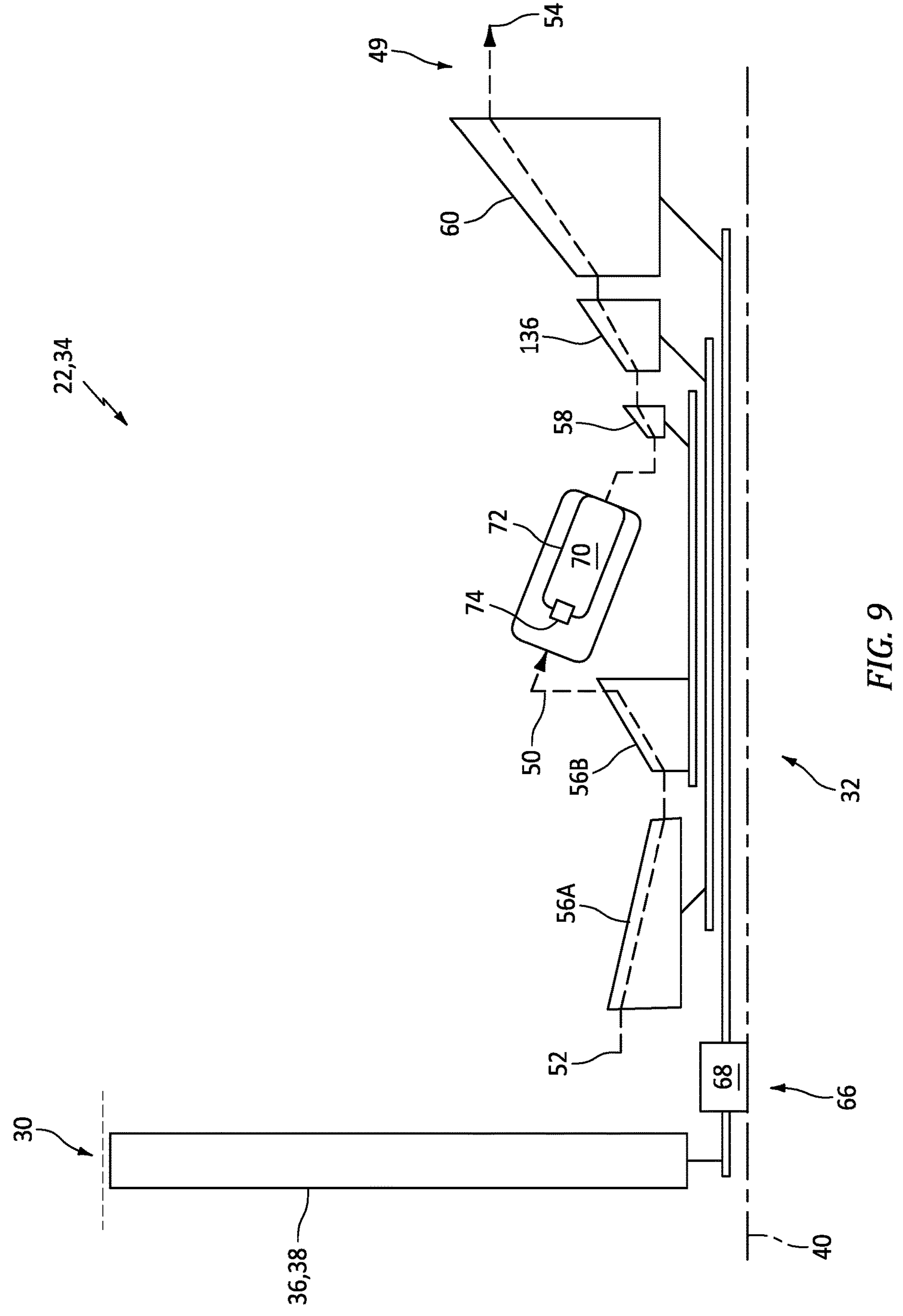
FIG. 9 is a partial schematic illustration of the powerplant with an additional rotating assembly.

The gas turbine engine 34 and its engine core 32 are shown in FIG. 1 with two rotating assemblies 42 and 44. The present disclosure, however, is not limited to such an exemplary arrangement. The engine core 32, for example, may alternatively be configured with a single rotating assembly, or with three or more rotating assemblies. The gas turbine engine 34 and its engine core 32 of FIG. 9, for example, is configured with an additional turbine rotor 136 (e.g., an intermediate pressure turbine (IPT) rotor) coupled to and configured to drive rotation of the compressor rotor 56A. Moreover, while the powerplant 22 is generally described above with respect to a gas turbine engine, the present disclosure is not limited to such an exemplary arrangement. It is contemplated, for example, the powerplant 22 may alternatively be configured with another type of internal combustion (IC) engine such as, but not limited to, a rotary engine (e.g., a Wankel engine).

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:

an engine;

a nacelle housing the engine;

a fuel system including a fuel circuit, a fuel source, a heat exchanger and a turboexpander, the fuel circuit configured to direct fuel in a liquid phase from the fuel source, through the heat exchanger and the turboexpander, to the engine for combustion, the fuel being in a gaseous phase when the fuel exits the heat exchanger, and the heat exchanger configured to transfer heat energy from combustion products generated by the combustion of the fuel in the engine into the fuel in the fuel circuit;

an air system discrete from the engine, the air system including an air compressor and the turboexpander, and the air system configured to expand the fuel directed across the turboexpander by the fuel circuit to power operation of the air compressor;

an engine inlet fluidly coupling the engine to an environment external to the aircraft; and an air circuit inlet fluidly coupling the air compressor to the environment external to the aircraft;

wherein the engine inlet and the air circuit inlet are each independently fluidly coupled to the environment external to the aircraft; and wherein the air compressor is located within an interior of a wing.

2. The system of claim 1, wherein
the fuel comprises hydrogen fuel; and
the fuel source comprises a hydrogen fuel reservoir.

3. The system of claim 1, wherein the fuel system is configured to store the fuel within the fuel source as a cryogenic liquid.

4. The system of claim 1, wherein
the heat exchanger is configured to facilitate changing the fuel from the liquid phase to the gaseous phase; and
the air system is configured to expand the fuel in the gaseous phase across the turboexpander before delivering the fuel in the gaseous phase to the engine.

5. The system of claim 1, wherein the engine comprises a gas turbine engine.

6. The system of claim 1, wherein
the engine includes a compressor section, a combustor section, a turbine section and a flowpath extending through the compressor section, the combustor section and the turbine section from the engine inlet into the flowpath to an exhaust from the flowpath; and
the heat exchanger is arranged along the flowpath between the combustor section and the exhaust from the flowpath.

7. The system of claim 6, wherein the heat exchanger is arranged along the flowpath between the turbine section and the exhaust from the flowpath.

8. The system of claim 1, further comprising a pneumatic system including an air circuit, the pneumatic system configured to receive compressed air through the air circuit from the air compressor.

9. The system of claim 8, wherein the pneumatic system includes a bleed air circuit, the pneumatic system is configured to receive additional compressed air from the bleed circuit fluidly coupled to the engine.

10. The system of claim 1, wherein the air compressor is fluidly decoupled from the engine.

11. The system of claim 1, further comprising a propulsor rotor coupled to and configured to be driven by the engine.

12. A system for an aircraft, comprising:
an engine;
an engine inlet fluidly coupling the engine to an environment external to the aircraft;
a pneumatic system;
an air system including an air compressor and a turboexpander, the air system configured to expand fuel directed across the turboexpander to power operation of the air compressor, and the air compressor configured to provide compressed air for delivery to the pneumatic system;
an air system inlet fluidly coupling the air compressor to the environment external to the aircraft, the air system inlet fluidly coupling the air compressor to the environment external to the aircraft independently from the engine inlet fluidly coupling the engine to the environment external to the aircraft; and
a fuel system including a fuel circuit, a heat exchanger and the turboexpander, the fuel circuit configured to direct the fuel through the heat exchanger to the turboexpander and to the engine for combustion, and the heat exchanger configured to increase a temperature and a pressure of the fuel;
wherein the pressure of the fuel entering the turboexpander is a first pressure and the pressure of the fuel exiting the turboexpander is a second pressure less than the first pressure; and
wherein the fuel circuit is further configured to deliver the fuel from the turboexpander to the engine for combustion at the second pressure;
wherein the aircraft comprises a first aircraft structure and a second aircraft structure, the first aircraft structure comprises the engine, and the second aircraft structure comprises at least one of a fuselage or a wing; and
wherein the air compressor and the turboexpander are arranged within the second aircraft structure.

13. The system of claim 12, wherein the pneumatic system comprises a pneumatic anti-icing system.

14. The system of claim 12, wherein the pneumatic system comprises a pneumatic actuator.

15. The system of claim 12, wherein the pneumatic system comprises an environmental control system for the aircraft.

16. A system for an aircraft, comprising:
a fuselage;
a gas turbine engine including a compressor section, a combustor section, a turbine section and a flowpath extending through the compressor section, the combustor section and the turbine section from an engine inlet into the flowpath to an exhaust from the flowpath, the engine inlet fluidly coupling the gas turbine engine to an environment external to the aircraft;
a fuel system configured to deliver fuel to the combustor section, the fuel system including a fuel circuit, a fuel source, a heat exchanger and a turboexpander, the fuel circuit fluidly coupling the fuel source to the combustor section, and the fuel circuit extending sequentially through the heat exchanger, the turboexpander between the fuel source and the combustor section, and to the combustor section; and
an air system including an air compressor and the turboexpander, the air compressor fluidly independent of the flowpath, and a turboexpander rotor in the turboexpander coupled to and configured to drive rotation of an air compressor rotor in the air compressor, the air compressor comprising an air compressor inlet fluidly coupling the air compressor to the environment external to the aircraft;
wherein the fuel system is configured such that the heat exchanger provides the fuel to the turboexpander as warm and high pressure gaseous fuel, and the turboexpander expands the warm and high pressure gaseous fuel to provide low pressure gaseous fuel;
wherein the fuel system is further configured to deliver the low pressure gaseous fuel to one or more fuel injectors in the combustor section;
wherein the engine inlet and the air compressor inlet are each separately fluidly coupled to the environment external to the aircraft; and
wherein the air system is located within an interior portion of the fuselage.

* * * * *